(12) United States Patent
Miyahara (10) Patent No.: US 12,300,003 B2
(45) Date of Patent: May 13, 2025

(54) METHOD FOR IDENTIFYING ROAD MARKINGS AND MONOCULAR CAMERA

(71) Applicant: GREAT WALL MOTOR COMPANY LIMITED, Hebei (CN)

(72) Inventor: Shunji Miyahara, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 263 days.

(21) Appl. No.: 17/637,885

(22) PCT Filed: Sep. 4, 2020

(86) PCT No.: PCT/CN2020/113499
§ 371 (c)(1),
(2) Date: Feb. 24, 2022

(87) PCT Pub. No.: WO2021/047452
PCT Pub. Date: Mar. 18, 2021

(65) Prior Publication Data
US 2022/0319195 A1    Oct. 6, 2022

(30) Foreign Application Priority Data

Sep. 9, 2019    (CN) .......................... 201910847309.7

(51) Int. Cl.
*G06V 20/56*     (2022.01)
*G06T 7/11*      (2017.01)
*G06V 10/22*     (2022.01)

(52) U.S. Cl.
CPC .............. *G06V 20/588* (2022.01); *G06T 7/11* (2017.01); *G06V 10/225* (2022.01); *G06T 2207/10004* (2013.01); *G06T 2207/30256* (2013.01)

(58) Field of Classification Search
CPC ...... G06V 20/588; G06V 10/225; G06T 7/11; G06T 2207/10004; G06T 2207/30256
(Continued)

(56) References Cited

U.S. PATENT DOCUMENTS 6,813,383 B1    11/2004 Sakurai
2011/0085703 A1*    4/2011 Wiedemann ........... G06V 20/13
382/103

(Continued)

FOREIGN PATENT DOCUMENTS

CN    101477629 A    7/2009
CN    104951744 A    9/2015
(Continued)

OTHER PUBLICATIONS

International Search Report for PCT /CN2020/113499 issued Dec. 1, 2020.
(Continued)

*Primary Examiner* — Thai Q Tran
*Assistant Examiner* — Nienru Yang
(74) *Attorney, Agent, or Firm* — Schmeiser, Olsen & Watts LLP (57)    ABSTRACT

A method and a device for identifying road markings, and a monocular camera is provided. The method includes: acquiring an original image captured by a monocular camera on a vehicle; determining a middle region where an object is located and left and right regions on both sides of the middle region from the original image; acquiring an image intensity distribution along a vertical direction of the original image in the left region, the right region and the middle region; and determining whether the object is a road marking by comparing an image intensity of the middle region relative to
(Continued)

image intensities of the left region or the right region. The present application can achieve the object of accurately identifying road markings.

9 Claims, 7 Drawing Sheets

(58) Field of Classification Search
USPC .......................................................... 348/148
See application file for complete search history.

(56) References Cited

U.S. PATENT DOCUMENTS

2011/0205362 A1* 8/2011 Suzuki ................. G06V 20/588
348/148
2017/0010618 A1* 1/2017 Shashua ............. G01C 21/3896

FOREIGN PATENT DOCUMENTS

| CN | 104978560 A | | 10/2015 | |
|---|---|---|---|---|
| CN | 106373134 A | | 2/2017 | |
| CN | 107066986 A | | 8/2017 | |
| CN | 109389024 A | * | 2/2019 | ......... G06K 9/00791 |
| CN | 109635737 A | | 4/2019 | |
| CN | 111523360 A | | 8/2020 | |
| WO | 2013133086 A1 | | 9/2013 | |

OTHER PUBLICATIONS

Lu, Weina et al.—Synchronous Detection of the Lane Marking and Road Boundary on Monocular Vision, Chinese Journal of Sensors and Actuators, vol. 20. No. 5. May 31, 2007 (May 31, 2007).

* cited by examiner

METHOD FOR IDENTIFYING ROAD MARKINGS AND MONOCULAR CAMERA

CROSS-REFERENCE TO RELATED APPLICATIONS

This application claims priority to PCT Application No. PCT/CN2020/113499, having a filing date of Sep. 4, 2019Sep. 4, 2020, which claims priority to Chinese Application No. 201910847309.7, having a filing date of Sep. 9, 2019, the entire contents both of which are incorporated herein by reference.

FIELD OF TECHNOLOGY

The present application relates to the technical field of intelligent transportation, and more particularly to a method and a device for identifying road markings, and a monocular camera.

BACKGROUND

At present, vehicles with autonomous driving (AD) function or Advanced Driver Assistance System (ADAS) have begun to be introduced to the market, which has greatly promoted the development of intelligent transportation. In the conventional art, the sensors that support AD/ADAS mainly include radars, visual camera systems, laser radars, ultrasonic sensors, etc. Among them, the visual camera systems are the most widely used because the visual camera systems can obtain the same two-dimensional image information as human vision. With the expansion of the application range, the requirements for the visual camera systems in terms of detection rate, misrecognition, distance accuracy, etc. will become higher and higher.

Figure 1A:
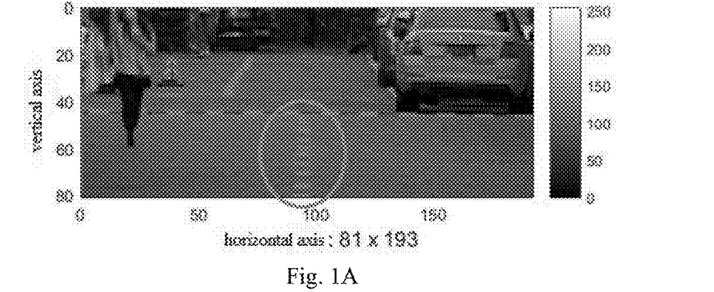
FIG. 1A is a diagram showing an original image of road dotted lines and a difference image processed by a visual camera system.
Figure 1B:
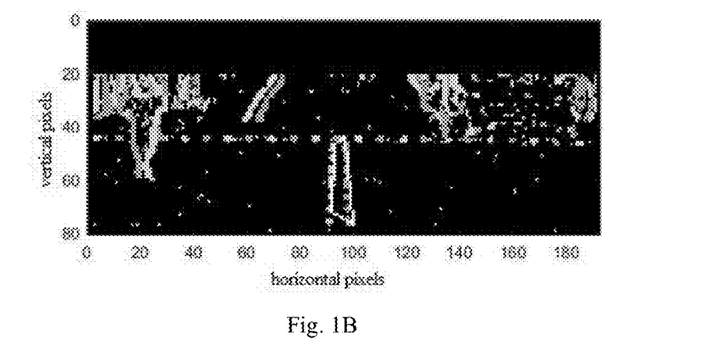
FIG. 1B is a diagram showing an original image of road dotted lines and a difference image processed by a visual camera system.
Figure 1C:
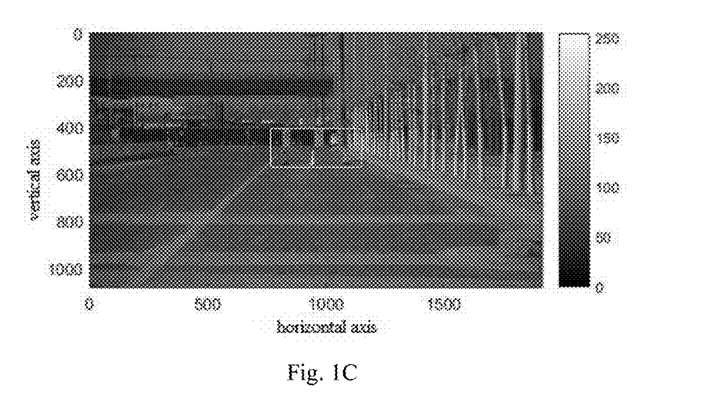
FIG. 1C is a diagram showing an original image of a traffic cone and a difference image processed by the visual camera system.
Figure 1D:
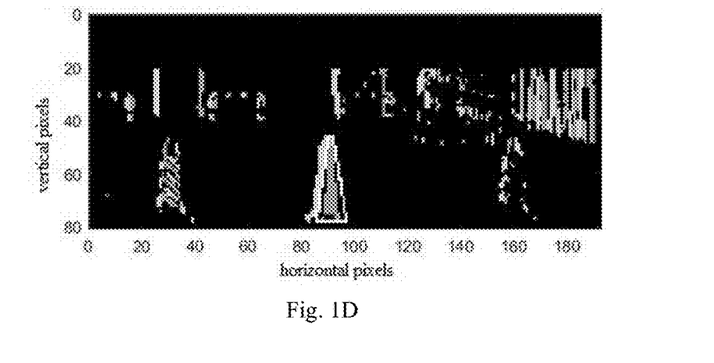
FIG. 1D is a diagram showing an original image of a traffic cone and a difference image processed by the visual camera system.

However, existing visual camera systems have great trouble in accurately distinguishing road markings and objects. Taking, for example, traffic cones and road dotted lines, which are visually different to the naked eyes, but the images captured by visual camera systems of the vehicle are almost identical. For example, FIG. 1A and FIG. 1B are diagrams showing the original image of the road dotted lines and the difference image processed by the visual camera system, respectively, FIG. 1C and FIG. 1D are diagrams showing the original image of the traffic cones and the difference image processed by the visual camera system, respectively. Corresponding to FIG. 1A and FIG. 1B, it is easy to see that the dotted line markers and the traffic cones are visually distinct, but are similar in the difference images. This is an inherent problem with visual camera systems using monocular cameras, such that it is difficult for the monocular cameras to recognize road markings.

In this regard, various methods have been proposed in the conventional art to improve the ability of the visual camera systems to distinguish road markings and cubic objects, mainly including the following two methods:

1) Using a stereo camera with at least two cameras to distinguish road markings and objects. In this solution, on one hand, at least two cameras are required, and on the other hand, there are strict requirements on the distance between the two cameras. For example, when the distance between the two cameras is set to be less than 350 mm, the objects marked on the road ahead can be barely distinguished. However, at this time, the ranging range of the stereo camera is limited to a range less than 70 m.

2) Using a time series of captured multiple images to distinguish road markings and objects, but this requires multiple images at different distances.

Therefore, there is currently no effective method to accurately identify road markings in a visual camera system by using a monocular camera.

SUMMARY

An aspect relates to a method for identifying road markings, so as to realize accurate recognition of road targets based on images of a monocular camera.

In order to achieve above aspect, the technical solution of the present application is realized as follows:

A method for identifying road markings, the method includes: acquiring an original image captured by a monocular camera on a vehicle; determining a middle region where an object is located and left and right regions on both sides of the middle region from the original image; acquiring an image intensity distribution along a vertical direction of the original image in the left region, the right region and the middle region; and determining whether the object is a road marking by comparing an image intensity of the middle region relative to image intensities of the left region or the right region.

Further, after the step of acquiring original image captured by a monocular camera on a vehicle, the method further includes: processing image preprocessing on the original image to obtain a corresponding differential image; acquiring a binary image or a ternary image by applying a threshold to the differential image; acquiring edge points in the binary image or the ternary image; grouping the edge points according to edge point continuity, and estimating an edge line of the object according to each acquired edge point group; and determining the object to be the road marking when a number of groups included in the edge line is greater than a preset group threshold and a number of edge points in each of the groups is less than a preset point threshold.

Further, the step of determining a middle region where an object is located and left and right regions on both sides of the middle region from the original image includes: processing image preprocessing on the original image to obtain a corresponding differential image; acquiring a binary image or a ternary image by applying a threshold to the differential image; acquiring edge points in the binary image or the ternary image; grouping the edge points according to edge point continuity to obtain several edge point groups; arranging the middle region to include the edge point groups in the binary image or the ternary image; and arranging the left region and the right region at left and right sides of the middle region, respectively.

Further, the step of determining whether the object is a road marking by comparing an image intensity of the middle region relative to image intensities of the left region or the right region includes: calculating a first intensity average value, wherein the first intensity average value is an image intensity average value in the left region or the right region; calculating a second intensity average value, wherein the second intensity average value is an image intensity average value of peak values or valley values of the image intensity distribution in the middle region; determining, if a difference between the first intensity average value and the second intensity average value is less than a preset average value threshold, the object to be the road marking; and the preset average value threshold is configured to be less than a difference between the image intensity average value of the peak values and the image intensity average value of the valley values.

Further, after the step of determining whether the object is a road marking by comparing an image intensity of the middle region relative to image intensities of the left region or the right region, the method further includes: calculating a first intensity standard deviation, wherein the first intensity standard deviation is an image intensity standard deviation in the left region or the right region; calculating a second intensity standard deviation, wherein the second intensity standard deviation is the image intensity standard deviation of the peak values or valley values of the image intensity distribution in the middle region; and determining, if a difference between the first intensity standard deviation and the second intensity standard deviation is less than a preset standard deviation threshold and a difference between an average image intensity of the peak values and the valley values is greater than the first intensity standard, the object to be the road marking.

Further, after the step of acquiring an image intensity distribution along a vertical direction of the original image in the left region, the right region and the middle region, and before the step of determining whether the object is a road marking by comparing an image intensity of the middle region relative to image intensities of the left region or the right region, the method further includes: performing linear regression processing on the left region and the right region to obtain respective linear regression lines; calculating an average linear regression line of the left region and the right region according to the respective corresponding linear regression lines of the left region and the right region; and compensating the image intensity distribution along the vertical direction of the original image in the left region, the right region and the middle region according to the average linear regression line.

Compared to the conventional art, by adding the method of the present application to an object detection method of a common monocular camera, the road markings can be accurately identified.

A further aspect of the present application is to provide a device for identifying road markings, the device includes: an image acquiring module, configured for acquiring an original image captured by a monocular camera on a vehicle; a region determining module, configured for determining a middle region where an object is located and left and right regions on both sides of the middle region from the original image; an intensity acquiring module, configured for acquiring an image intensity distribution along a vertical direction of the original image in the left region, the right region and the middle region; and a first identifying module, configured for determining whether the object is a road marking by comparing an image intensity of the middle region relative to image intensities of the left region or the right region.

Further, the device further includes: a second identifying module, configured for executing: processing image preprocessing on the original image to obtain a corresponding differential image; acquiring a binary image or a ternary image by applying a threshold to the differential image; acquiring edge points in the binary image or the ternary image; grouping the edge points according to edge point continuity, and estimating an edge line of the object according to each acquired edge point group; and determining the object to be the road marking when a number of groups included in the edge line is greater than a preset group threshold and a number of edge points in each of the groups is less than a preset point threshold.

Further, the region determining module includes:
an image processing sub-module, configured for processing image preprocessing on the original image to obtain a corresponding differential image, acquiring a binary image or a ternary image by applying a threshold to the differential image, acquiring edge points in the binary image or the ternary image, and grouping the edge points according to edge point continuity to obtain several edge point groups; and
a region determining sub-module, configured for arranging the middle region to include the edge point groups in the binary image or the ternary image; and arranging the left region and the right region at left and right sides of the middle region, respectively.

Further, the first identifying module includes: a first calculating sub-module, configured for calculating a first intensity average value, wherein the first intensity average value is an image intensity average value in the left region or the right region; a second calculating sub-module, configured for calculating a second intensity average value, wherein the second intensity average value is an image intensity average value of peak values or valley values of the image intensity distribution in the middle region; and a first determining sub-module, configured for determining, if a difference between the first intensity average value and the second intensity average value is less than a preset average value threshold, the object to be the road marking; wherein the preset average value threshold is configured to be less than a difference between the image intensity average value of the peak values and the image intensity average value of the valley values.

Further, the first identifying module further includes: a third calculating sub-module, configured for calculating a first intensity standard deviation, wherein the first intensity standard deviation is an image intensity standard deviation in the left region or the right region; a fourth calculating sub-module, configured for calculating a second intensity standard deviation, wherein the second intensity standard deviation is the image intensity standard deviation of the peak values or valley values of the image intensity distribution in the middle region; and a second determining sub-module, configured for determining, if a difference between the first intensity standard deviation and the second intensity standard deviation is less than a preset standard deviation threshold and a difference between an average image intensity of the peak values and the valley values is greater than the first intensity standard, the object to be the road marking.

Further, the device further includes: an intensity compensation module, configured for executing:
performing linear regression processing on the left region and the right region to obtain respective linear regression lines;
calculating an average linear regression line of the left region and the right region according to the respective corresponding linear regression lines of the left region and the right region; and
compensating the image intensity distribution along the vertical direction of the original image in the left region, the right region and the middle region according to the average linear regression line.

The device for identifying road markings has the same benefic effects as the method for identifying road markings above-mentioned relative to the prior art, which are not repeated again.

A further object of the present application is to provide a monocular camera, to achieve accurate identification of road targets based on the images captured by the monocular camera.

In order to achieve above object, the technical solution of the present application is realized as follows:

A monocular camera, provided with the device for identifying road markings above-mentioned.

A monocular camera, which includes: one or more processors; and a memory, configured for storing one or more programs; when the one or more programs is executed by the one or more processors, the method for identifying road markings above-mentioned is completed by the one or more processors.

The monocular camera has the same benefic effects as the method for identifying road markings above-mentioned relative to the conventional art, which are not repeated again.

A further aspect of the present application is to provide a machine-readable storage medium and a processor, to achieve accurate identification of road targets based on the images captured by the monocular camera.

In order to achieve above aspect, the technical solution of the present application is realized as follows:

A machine-readable storage medium having stored thereon with instructions, and the instructions are configured for executing the method for identifying road markings above-mentioned by the machine.

A processor for running a program, and when the program is operated, to execute the method for identifying road markings above-mentioned.

The machine-readable storage medium and the processor for identifying road markings has the same benefic effects as the method for identifying road markings above-mentioned relative to the conventional art, which are not repeated again.

Other features and advantages of the present application will be described in detail in the detailed description that follows.

BRIEF DESCRIPTION

Some of the embodiments will be described in detail, with reference to the following figures, wherein like designations denote like members, wherein.

DESCRIPTION OF REFERENCE NUMBERS

310, left region; 320, middle region; 330, right region; 340, object to be estimated; 1010, image acquiring module; 1020, intensity acquiring module; 1030, first identifying module.

DETAILED DESCRIPTION

It should be noted that the embodiments of the present application and the features of the embodiments may be combined with each other without conflict.

It should be noted that, in the embodiments of the present application, when referring to the identifying objects, the objects targeted include both road markings and cubic objects. That is, corresponding to a certain object, before applying the solution of the embodiment of the present application for identification, it cannot be determined whether it is a road marking or a cube object. The road markings include dotted lines and the like, and the cubic objects include traffic cones and the like.

The present application will be described in detail below with reference to the accompanying drawings and in conjunction with the embodiments.

Embodiment 1

Figure 2:
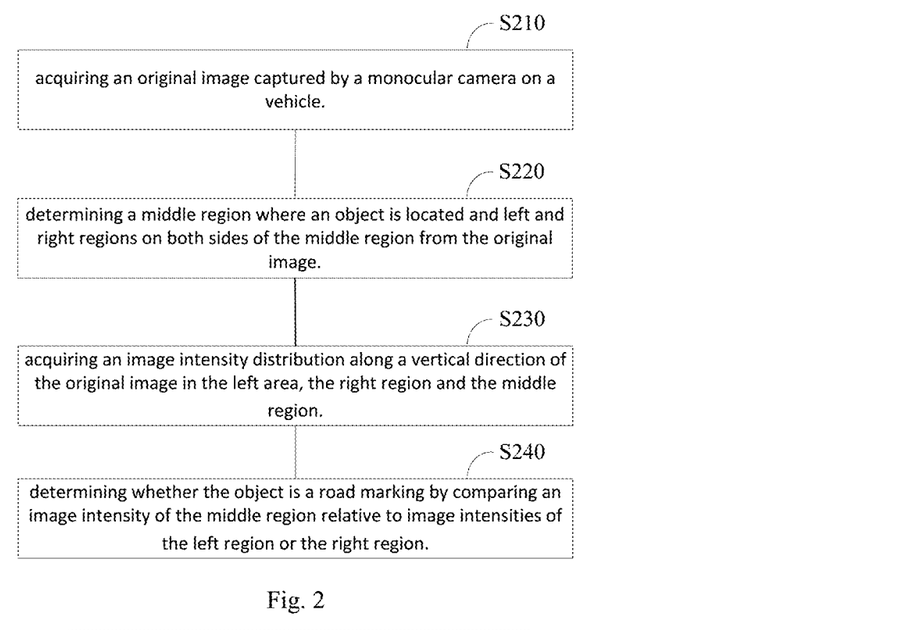
FIG. 2 is a schematic flowchart of a method for identifying road markings according to an embodiment 1 of the present application.

FIG. 2 is a schematic flowchart of a method for identifying road markings according to the embodiment 1 of the present application. As shown in FIG. 2, the method for identifying road markings may include the following steps:

Step S210: acquiring an original image captured by a monocular camera on a vehicle.

Step S220: determining a middle region where an object is located and left and right regions on both sides of the middle region from the original image.

In an embodiment, the step S220 further includes: processing image preprocessing on the original image to obtain a corresponding differential image; acquiring a binary image or a ternary image by applying a threshold to the differential image; acquiring edge points in the binary image or the ternary image; grouping the edge points according to edge point continuity to obtain several edge point groups; arranging the middle region to include the edge point groups in the binary image or the ternary image; and arranging the left region and the right region at left and right sides of the middle region, respectively.

The method of converting the original image of the monocular camera into a binary image or a ternary image is conventional in the art, so the details thereof will not be described again. That is, in the embodiment of the present application, the differential image may be a binary image or a ternary image. In addition, conventional edge processing techniques are applied to the binary/ternary images and further grouped into edge point groups.

Figure 3A:
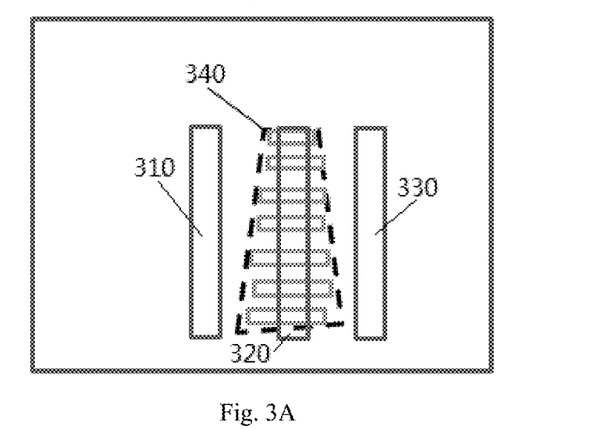
FIG. 3A is a schematic diagram showing the region defined by the dotted lines in FIG. 1A in an embodiment of the present application.

Accordingly, the original image is set with a middle region where the object is located, and left and right regions on both sides of the middle region. Taking the dotted line marking shown in FIG. 1A as an example, FIG. 3A is a schematic diagram is shown for the region defined by the dotted line in FIG. 1A, where the middle region 320 is located at the object to be estimated 340, and the left region 310 and the right region 330 are located on both sides of the object to be estimated 340.

Step S230: acquiring an image intensity distribution along a vertical direction of the original image in the left area, the right region and the middle region.

The image intensity refers to the intensity of each pixel, and the corresponding image intensity distribution can be directly obtained from the monocular camera. Herein, FIG. 3B is a schematic diagram of the image intensity distribution corresponding to the left region, the right region, and middle region initially obtained in the embodiment of the present application, as shown in FIG. 3B, since the middle region 320 contains objects, such that the presented image intensity varies greatly, while the left region 310 and the right region 320 present relatively smooth image intensities.

Figure 3B:
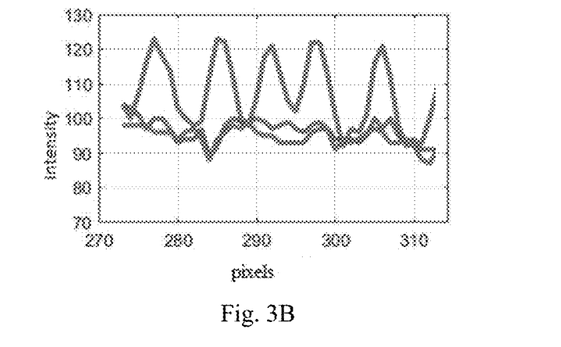
FIG. 3B is a schematic diagram of the image intensity distribution corresponding to the left region, the right region, and middle region initially obtained in the embodiment of the present application.
Figure 4:
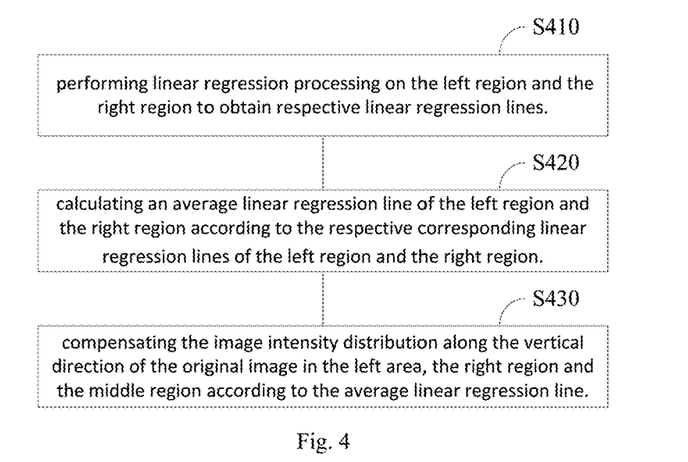
FIG. 4 is a schematic flowchart of a method for compensating for a linear deviation of image intensity in a middle region by using linear regression according to an embodiment of the present application.

In addition, as shown in FIG. 3B, the image intensity curve of the middle region 320 has a problem of linear deviation, and all image intensity values of which decrease linearly along the horizontal axis. In this regard, in order to ensure the accuracy of subsequent identification of road markings, it should be considered to eliminate the linear deviation of the image intensity of the middle region 320. As such, In an embodiment of the present application, a method of compensating for the linear deviation of the image intensity of the middle region 320 using linear regression is provided. FIG. 4 is a schematic flowchart of a method for compensating for a linear deviation of image intensity in the middle region 320 by using linear regression, as shown in FIG. 4, the method includes the following steps:

Step S410: performing linear regression processing on the left region and the right region to obtain respective linear regression lines.

Step S420: calculating an average linear regression line of the left region and the right region according to the respective corresponding linear regression lines of the left region and the right region.

Step S430: compensating the image intensity distribution along the vertical direction of the original image in the left area, the right region and the middle region according to the average linear regression line.

Figure 3C:
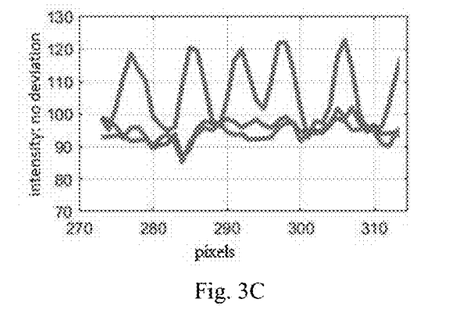
FIG. 3C is a schematic diagram of a new image intensity distribution after the method of FIG. 4 is used to compensate the image intensity distribution of FIG. 3B.

FIG. 3C is a schematic diagram of a new image intensity distribution after the method of FIG. 4 is used to compensate the image intensity distribution of FIG. 3B, as shown in FIG. 3C, the compensated image intensity of the middle region 320 no longer has a linear deviation.

Step S240: determining whether the object is a road marking by comparing an image intensity of the middle region relative to image intensities of the left region or the right region.

Figure 5:
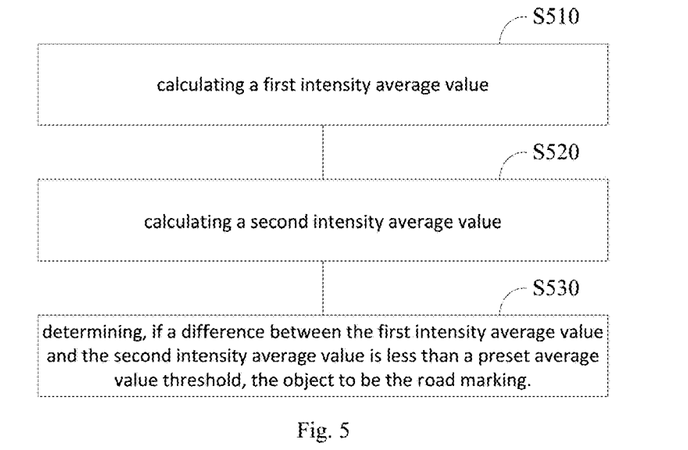
FIG. 5 is a schematic flowchart showing whether a corresponding object is a road marking based on the image intensities of the three regions.

For the road markings, relative to a cubic object (such as a traffic cone), the peak values or valley values of the image intensity will be closer to the image intensity of the image parts on both sides, therefore by comparing the middle region with respect to the image intensity of the left region or the right region to determine whether the object in the original image is a road marking. In an embodiment, FIG. 5 is a schematic flowchart showing whether a corresponding object is a road marking based on the image intensities of the three regions, as shown in FIG. 5, the following steps may be included:

Step S510: calculating a first intensity average value, wherein the first intensity average value is an image intensity average value in the left region or the right region.

For example, setting the average values of the image intensity of the left region and the right region be ave_1 and ave_2 respectively, which can be obtained by performing conventional mathematical statistical analysis on the image pixels of the left region and the right region.

Step S520: calculating a second intensity average value, wherein the second intensity average value is an image intensity average value of peak values or valley values of the image intensity distribution in the middle region.

Figure 3D:
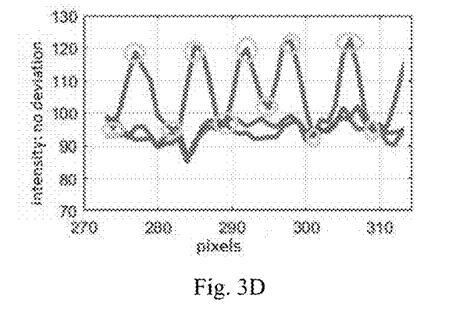
FIG. 3D is a schematic diagram of picking peak values and valley values from the image intensity distribution image in FIG. 3C.

FIG. 3D is a schematic diagram of picking peak values and valley values from the image intensity distribution image in FIG. 3C; referring to FIG. 3D, further perform mathematical statistics analysis on the average value of the picked peak values and valley values, the average image intensity of the corresponding peak values or valley values can be obtained, for example, it can be set as ave2_h and ave2_b respectively.

Step S530: determining, if a difference between the first intensity average value and the second intensity average value is less than a preset average value threshold, the object to be the road marking.

Here, the preset average value threshold is generally set to be a smaller value, such that the difference between the first intensity average value and the second intensity average value is sufficiently small. The preset average value threshold is configured to be much smaller than the difference between the image intensity average value of the peak values and the image intensity average value of the valley values. This shows that the pixels of the peak values and valley values of the middle region 320 are closer to the left region 330 or the right region 330, so that the object is more likely to be a road marking.

In an embodiment, the preset average value threshold may be a quarter of the difference between the image intensity average values of the peak values and the valley values. Taking this as an example, the determination process of step S530 can be expressed as follows:

If abs (ave2_h-ave_1)<abs (ave2_h-ave2_b)/4, it is determined as a dotted line, with the peak on the left; (1)

If abs (ave2_b-ave_1)<abs (ave2_h-ave2_b)/4, it is determined as a dotted line, with the valley on the left; (2)

In the formula, ave_3 can be used instead of ave_1.

Referring to FIG. 3D, the corresponding values are [ave_1, ave_3]=[94.5, 93.9], [ave2_b]=94.5, [ave2_h]

Figure 3E:
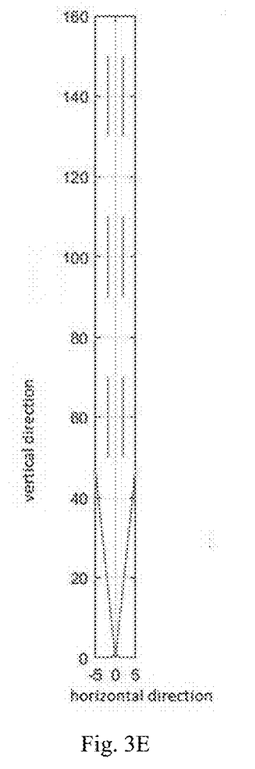
FIG. 3E is a schematic diagram of the result of object detection on the scene in FIG. 3A.

=120.7, it can be seen that the above formula (2) is satisfied, and the identified object is the dotted lines where the valley in on the left. Accordingly, FIG. 3E is a schematic diagram of the result of target detection on the scene shown in FIG. 3A. It can be seen that the objects in the analysis region are dotted lines, so substantially no objects belonging to the cubic objects are identified.

Returning to FIG. 1A-FIG. 1D, using the method of the embodiment of the present application, it is possible to accurately identify whether the object to be estimated is a road marking based on a single-frame image of a monocular camera, and FIG. 3A-FIG. 3E confirm that the method of the embodiment of the present application works well when applied to actual image data.

Embodiment 2

The method of the embodiment 1 of the present application can accurately identify road markings in most scenarios, but in some very complex scenes, such as when multiple types of dotted lines and cube objects are involved, the identify reliability of the method of the embodiment 1 of the present application will be reduced. Among them, ghost objects are the most typical road markings, which can be dotted lines, but are not real cube objects because they can only be drawn on the road surface. In this regard, the embodiment 2 of the present application introduces more parameters on the basis of the embodiment 1 to better identify the road markings.

Figure 6:
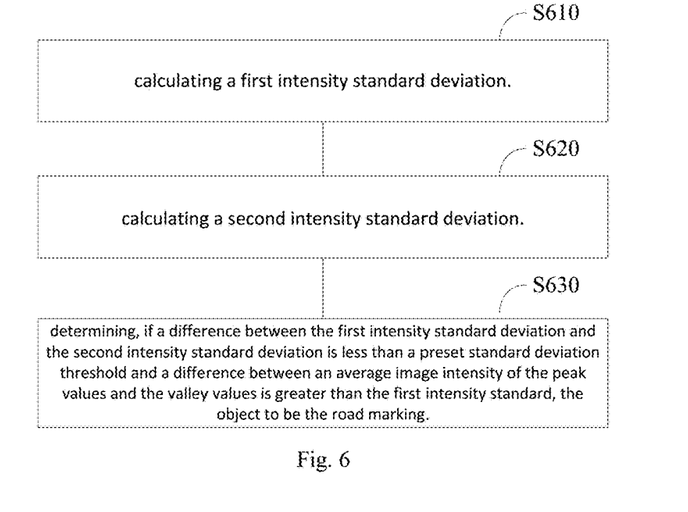
FIG. 6 is a schematic flowchart of a method for identifying road markings according to an embodiment 2 of the present application.

FIG. 6 is a schematic flowchart of a method for identifying road markings according to the embodiment 2 of the present application. On the basis of the method in the embodiment 1, the method may further include the following steps:

Step S610: calculating a first intensity standard deviation.

Among them, the first intensity standard deviation is an image intensity standard deviation in the left region or the right region.

For example, setting the standard deviations of the image intensity of the left region and the right region be std_1 and std_3 respectively, where the standard deviation and the average value are both commonly used parameters in mathematical statistics. Routine mathematical statistical analysis was performed to obtain the corresponding standard deviation.

Step S620: calculating a second intensity standard deviation.

Among them, the second intensity standard deviation is the image intensity standard deviation of the peak values or valley values of the image intensity distribution in the middle region.

Referring to the solution of determining the average value of the image intensity of the peak values or the valley values in step S520, for example, the standard deviation of the image intensity of the peak values or the valley values can be set as std2_h and std2_b, respectively.

Step S630: determining, if a difference between the first intensity standard deviation and the second intensity standard deviation is less than a preset standard deviation threshold and a difference between an average image intensity of the peak values and the valley values is greater than the first intensity standard, the object to be the road marking. Among them, the difference between the average image intensity of the peak values and the valley values is much larger than the first intensity standard deviation.

Among them, the preset standard deviation threshold can be set as required, and is set to be a smaller value, so as to make the pixels of the slope peak or slope valley of the middle region 320 closer to the left region 310 or the right region 330 based on the standard deviation, so that the reliability of determining whether the object is a road marking is higher.

In an embodiment, the first intensity standard deviations std_1 and std_3 can also be combined with the second intensity average values ave2_h, ave2_b corresponding to the middle region to determine whether to end the identifying of the road markings, for example, corresponding to the above formula (1) and (2), the determining process can be further expressed as follows:

If abs (ave2_h-ave2_b)/4<std_1 or abs (ave2_h-ave2_b)/4<std_1, the recognition is ended, that is, it cannot be regarded as dotted lines; (3)

In the formula, std_3 can be used instead of std_1.

Combined with the content of the embodiment 1, the embodiment 2 of the present application adds the using of the image intensity standard deviation to further determine whether the road marking is identified, so that the method of the embodiment of the present application can be applied to more complex road scenes and improves the accuracy of road marking identifying of the present application.

Figure 7:
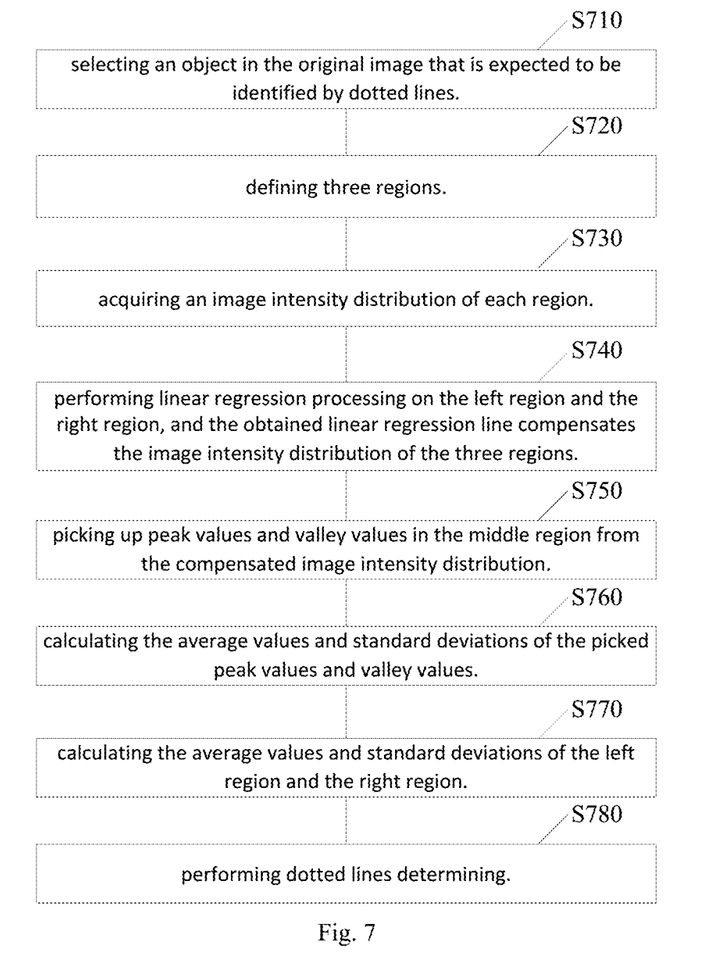
FIG. 7 is a schematic diagram of execution steps of an example of the method in combination with the embodiments 1 and 2.

In combination above, taking the dotted lines determining as an example, the specific execution steps of the example that combines the methods of the embodiment 1 and the embodiment 2 are given below, as shown in FIG. 7, which specifically includes the following steps:

Step S710: selecting an object in the original image that is expected to be identified by dotted lines.

As shown in FIG. 1A, a circle is used to determine an analysis region, which includes the object to be estimated that is expected to be identified.

Step S720: defining three regions.

As shown in FIG. 3A, a left region 310, a middle region 320, and a right region 330 are defined.

In step S730: acquiring an image intensity distribution of each region.

As shown in FIG. 3B, the image intensity distribution of each region is drawn.

Step S740: performing linear regression processing on the left region and the right region, and the obtained linear regression line compensates the image intensity distribution of the three regions.

Specifically, the above steps S410-S430 may be referred to, to acquire the image intensity distribution diagram after compensation as shown in FIG. 3C.

Step S750: picking up peak values and valley values in the middle region from the compensated image intensity distribution.

As shown in FIG. 3D, the peak values and valley values in the middle region are picked.

Step S760: calculating the average values and standard deviations of the picked peak values and valley values, that is, the average values ave2_h, ave2_b, and the standard deviations std2_h and std2_b.

Step S770: calculating the average values and standard deviations of the left region and the right region, that is, the average values ave_1 and ave_3 and the standard deviations std_1 and std_3.

In step S780: performing dotted lines determining.

Specifically, it is determining whether the above formulas (1)-(3) are established. If the formula (3) is established, it indicates that it is impossible to determine whether it is dotted lines, so the determining is ended; if the formulas (1) and (2) are established, it is determined that it is dotted lines, and the determining is ended. In the case where it is impossible to determine whether it is dotted lines by formulas (1)-(3), the image intensity standard deviation can be further introduced to determine, for example, the following formula can be used to determine:

If abs (std2_h-std_1)<abs (std2_h-std2_b)/n, it is determined as dotted lines, with the peak on the left; (4)

If abs (std2_b-std_1)<abs (std2_h-std2_b)/n, it is determined as dotted lines, with the valley on the left; (5)

Among them, std_1 can be replaced by std_3, and n is a positive integer, for example, n is 4, so that the value of abs (std2_h-std2_b)/n, which is a preset standard deviation threshold, is sufficiently small.

In this way, compared with the embodiment 1, by adding the steps of standard deviation determining, the applicability and reliability of the method for identifying road markings according to the embodiment of the present application can be improved.

Embodiment 3

Figure 8:
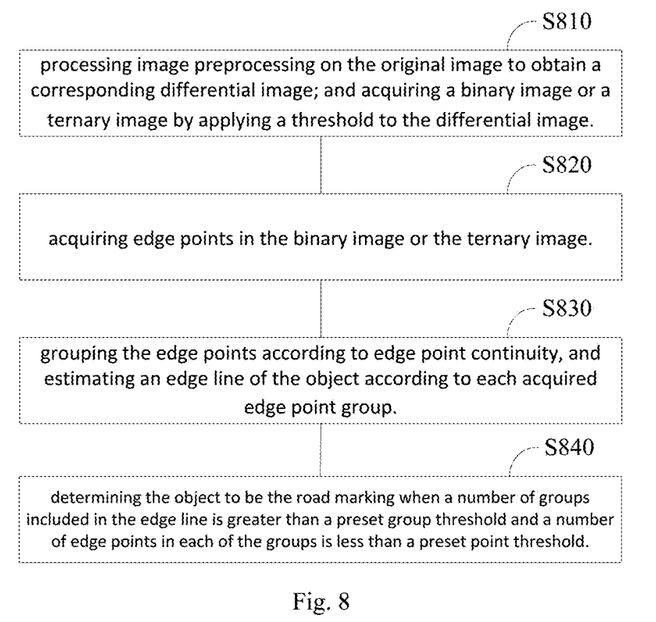
FIG. 8 is a schematic flowchart of a method for identifying road markings according to an embodiment 3 of the present application.

On the basis of the embodiment 1, the embodiment 3 of the present application provides another method for identifying road markings, which can be executed alone, or can be combined with the embodiment 1 to more comprehensively identify road markings. FIG. 8 is a schematic flowchart of a method for identifying road markings according to the embodiment 3 of the present application, as shown in FIG. 8, the following steps may be included:

Step S810: processing image preprocessing on the original image to obtain a corresponding differential image; and acquiring a binary image or a ternary image by applying a threshold to the differential image.

Step S820: acquiring edge points in the binary image or the ternary image.

Step S830: grouping the edge points according to edge point continuity, and estimating an edge line of the object according to each acquired edge point group.

Figure 9:
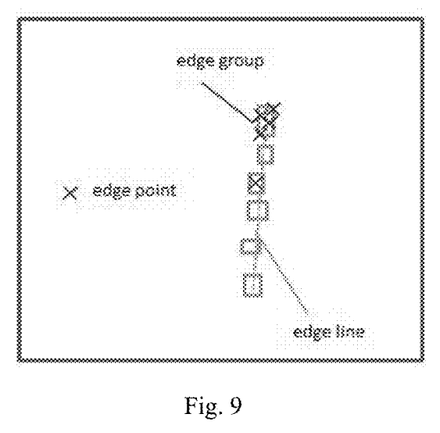
FIG. 9 is a schematic diagram of performing edge point grouping in an embodiment of the present application.

FIG. 9 is a schematic diagram of grouping edge points in an embodiment of the present application, wherein the formed edge group is defined as a combination of continuous edge points, and the corresponding edge lines can be estimated by correlating the edge groups with each other. Here, taking dotted lines as an example, it can be known that the edge points of the dotted lines are composed of many edge groups, and each edge group has a small number of edge points.

Step S840: determining the object to be the road marking when a number of groups included in the edge line is greater than a preset group threshold and a number of edge points in each of the groups is less than a preset point threshold.

For example, according to the characteristics of the dotted lines, if the group threshold and the point threshold are both 6, then a line segment that satisfies the following two conditions can be determined to be not a dotted line: 1) there are less than or equal to 6 groups; 2) the number of edge points in the group is greater than or equal to 6. Correspondingly, on the contrary, the line segment can be determined as a dotted line. It should be noted that the size of edge points in each group may be different, and it is preferable to use the largest edge point for determining.

The method of the embodiment 3 works well in most scenes, and is easier to implement than the methods of the embodiment 1 and the embodiment 2, so in some scenes, only the method of the embodiment 3 can be used for identifying road markings. However, when the edge groups are connected or some edge groups are discarded, this method cannot be implemented normally, so the embodiment of the present application further provides the methods of the embodiment 1 and the embodiment 2 to ensure accurate identification of road markings in a variety of scenes and working conditions.

Embodiment 4

The embodiment 4 of the present application is based on the same inventive idea as the embodiment 1, which provides a device for identifying road markings.

Figure 10:
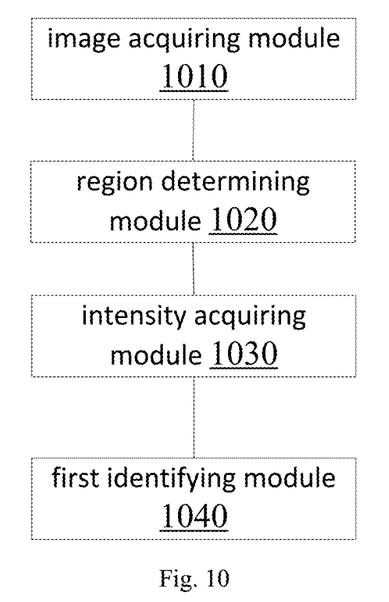
FIG. 10 is a schematic structural diagram of a device for identifying road markings according to an embodiment 4 of the present application.

FIG. 10 is a schematic structural diagram of a device for identifying road markings according to the embodiment 4 of the present application. As shown in FIG. 10, the device may include: an image acquiring module 1010, configured for acquiring an original image captured by a monocular camera on a vehicle; a region determining module 1020, configured for determining a middle region where an object is located and left and right regions on both sides of the middle region from the original image; an intensity acquiring module 1030, configured for acquiring an image intensity distribution along a vertical direction of the original image in the left area, the right region and the middle region; and a first identifying module 1040, configured for determining whether the object is a road marking by comparing an image intensity of the middle region relative to image intensities of the left region or the right region.

In an embodiment, the region determining module 1020 may include: an image processing sub-module, configured for processing image preprocessing on the original image to obtain a corresponding differential image, acquiring a binary image or a ternary image by applying a threshold to the differential image, acquiring edge points in the binary image or the ternary image, and grouping the edge points according to edge point continuity to obtain several edge point groups; and a region determining sub-module, configured for arranging the middle region to include the edge point groups in the binary image or the ternary image; and arranging the left region and the right region at left and right sides of the middle region, respectively.

In an embodiment, the first identifying module 1040 may include: a first calculating sub-module, configured for calculating a first intensity average value, wherein the first intensity average value is an image intensity average value in the left region or the right region; a second calculating sub-module, configured for calculating a second intensity average value, wherein the second intensity average value is an image intensity average value of peak values or valley values of the image intensity distribution in the middle region; and a first determining sub-module, configured for determining, if a difference between the first intensity average value and the second intensity average value is less than a preset average value threshold, the object to be the road marking; wherein the preset average value threshold is configured to be less than a difference between the image intensity average value of the peak values and the image intensity average value of the valley values.

Among them, in order to compensate the linear reduction of the image intensity of the original image in the left region, the right region and the middle region, the device according to the embodiment 4 of the present application may further include an intensity compensation module, which is configured for executing: performing linear regression processing on the left region and the right region to obtain respective linear regression lines; calculating an average linear regression line of the left region and the right region according to the respective corresponding linear regression lines of the left region and the right region; and compensating the image intensity distribution along the vertical direction of the original image in the left area, the right region and the middle region according to the average linear regression line.

Referring to the solution of the embodiment 2 of the present application, in a more preferred embodiment, the first identifying module 1040 may further include: a third calculating sub-module, configured for calculating a first intensity standard deviation, wherein the first intensity standard deviation is an image intensity standard deviation in the left region or the right region; a fourth calculating sub-module, configured for calculating a second intensity standard deviation, wherein the second intensity standard deviation is the image intensity standard deviation of the peak values or valley values of the image intensity distribution in the middle region; and a second determining sub-module, configured for determining, if a difference between the first intensity standard deviation and the second intensity standard deviation is less than a preset standard deviation threshold and a difference between an average image intensity of the peak values and the valley values is greater than the first intensity standard, the object to be the road marking.

Referring to the solution of the embodiment 3 of the present application, in a more preferred embodiment, the device of the embodiment 4 of the present application may further include: a second identifying module, configured for executing: processing image preprocessing on the original image to obtain a corresponding differential image; acquiring a binary image or a ternary image by applying a threshold to the differential image; acquiring edge points in the binary image or the ternary image; grouping the edge points according to edge point continuity, and estimating an edge line of the object according to each acquired edge point group; and determining the object to be the road marking when a number of groups included in the edge line is greater than a preset group threshold and a number of edge points in each of the groups is less than a preset point threshold.

For other implementation details and effects of the embodiment 4 of the present application, reference may be made to the foregoing embodiments 1 to 3, which will not be repeated herein.

Other embodiments of the present application also provide a monocular camera, which is provided with the device for identifying road markings in the embodiment 4. For example, the controller of the monocular camera can be configured as the device of the embodiment 4.

Other embodiments of the present application further provide a machine-readable storage medium, where instructions are stored on the machine-readable storage medium, and the instructions are used to cause a machine to execute the method for identifying road markings of the foregoing embodiment 1, embodiment 2 and/or embodiment 3.

Among them, the machine-readable storage medium includes but is not limited to phase random access memory (PRAM), static random access memory (SRAM), dynamic random access memory (DRAM), other types of random access memory (RAM), Read-Only Memory (ROM), Electrically Erasable Programmable Read-Only Memory (EE-PROM), Flash Memory or other memory technologies, Compact Disc Read-Only Memory (CD-ROM), Digital Versatile Disc (DVD)) or other optical storage, magnetic cassettes, magnetic tape-disk storage or other magnetic storage devices and various media that can store program code. Therein, the machine may be, for example, a controller of a monocular camera.

An embodiment of the present application provides a processor for running a program, wherein when the program runs, the above-mentioned method for identifying road markings is implemented.

An embodiment of the present application provides an apparatus, which includes a processor, a memory, and a program stored in the memory and executable on the processor, the processor implements the above method for identifying road markings when the processor executes the program. The apparatus is, for example, a monocular camera.

The application also provides a computer program product, when executed on a vehicle, adapted to execute a program initialized with the steps of the above-described method for identifying road markings.

As will be appreciated by those skilled in the art, the embodiments of the present application may be provided as a method, a system, or a computer program product. Accordingly, the present application may take the form of entirely hardware embodiments, entirely software embodiments, or embodiments combining software and hardware aspects. Furthermore, the present application may take the form of a computer program product embodied on one or more computer-usable storage media (including, but not limited to, disk storage, CD-ROM, optical storage, etc.) having computer-usable program code embodied therein.

The present application is described with reference to flowchart illustrations and/or block diagrams of methods, apparatus (systems), and computer program products according to embodiments of the present application. It will be understood that each flow and/or block in the flowchart illustrations and/or block diagrams, and combinations of flows and/or blocks in the flowchart illustrations and/or block diagrams, can be implemented by computer program instructions. These computer program instructions may be provided to the processor of a general purpose computer, special purpose computer, embedded processor or other programmable data processing device to produce a machine such that the instructions executed by the processor of the computer or other programmable data processing device produce Means for implementing the functions specified in one or more of the flowcharts and/or one or more blocks of the block diagrams.

These computer program instructions may also be stored in a computer-readable memory capable of directing a computer or other programmable data processing apparatus to function in a particular manner, such that the instructions stored in the computer-readable memory result in an article of manufacture comprising instruction means. An apparatus implements the functions specified in a flow or flows of the flowcharts and/or a block or blocks of the block diagrams.

These computer program instructions can also be loaded on a computer or other programmable data processing device to cause a series of operational steps to be performed on the computer or other programmable device to produce a computer-implemented process such that the instructions provide steps for implementing the functions specified in the flow or blocks of the flowcharts and/or the block or blocks of the block diagrams.

In a typical configuration, a computing apparatus includes one or more processors (CPUs), input/output interfaces, network interfaces, and memory. The above descriptions are only preferred embodiments of the present application, and are not intended to limit the present application. Any modification, equivalent replacement, improvement, etc. made within the spirit and principle of the present application shall be included within the scope of protection of the present application. Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed is:

1. A method for identifying road markings, comprising:
   acquiring an original image captured by a monocular camera on a vehicle;
   determining a middle region where an object is located and left and right regions on both sides of the middle region from the original image;
   acquiring an image intensity distribution along a vertical direction of the original image in the left region, the right region and the middle region; and
   calculating a first intensity average value, wherein the first intensity average value is an image intensity average value in the left region or the right region;
   calculating a second intensity average value, wherein the second intensity average value is an image intensity average value of peak values or valley values of the image intensity distribution in the middle region; and
   determining, if a difference between the first intensity average value and the second intensity average value is less than a preset average value threshold, the object to be the road marking;
   wherein the preset average value threshold is configured to be less than a difference between the image intensity average value of the peak values and the image intensity average value of the valley values;
   wherein the step of determining the middle region where the object is located and the left region and the right region on both sides of the middle region from the original image comprises:
   processing image preprocessing on the original image to obtain a corresponding differential image;
   acquiring a binary image or a ternary image by applying a threshold to the corresponding differential image;
   acquiring edge points in the binary image or the ternary image;
   grouping the edge points according to an edge point continuity to obtain several edge point groups;
   arranging the middle region to include the edge point groups in the binary image or the ternary image; and
   arranging the left region and the right region at left and right sides of the middle region, respectively.

2. The method according to claim 1, wherein after the step of acquiring the original image captured by a monocular camera on a vehicle, the method further comprises:
   processing image preprocessing on the original image to obtain a corresponding differential image;
   acquiring a binary image or a ternary image by applying a threshold to the differential image;
   acquiring edge points in the binary image or the ternary image;
   grouping the edge points according to an edge point continuity, and estimating an edge line of the object according to each acquired edge point group; and
   determining the object to be the road marking when a number of groups included in the edge line is greater than a preset group threshold and a number of edge points in each of the groups is less than a preset point threshold.

3. The method according to claim 1, wherein after the step of determining whether the object is the road marking by comparing the image intensity of the middle region relative to image intensities of the left region or the right region, the method further comprises:
   calculating a first intensity standard deviation, wherein the first intensity standard deviation is an image intensity standard deviation in the left region or the right region;
   calculating a second intensity standard deviation, wherein the second intensity standard deviation is the image intensity standard deviation of the peak values or valley values of the image intensity distribution in the middle region; and
   determining, if a difference between the first intensity standard deviation and the second intensity standard deviation is less than a preset standard deviation threshold and a difference between an average image intensity of the peak values and the valley values is greater than the first intensity standard, the object to be the road marking.

4. The method according to claim 1, wherein after the step of acquiring the image intensity distribution along the vertical direction of the original image in the left region, the right region and the middle region, and before the step of determining whether the object is the road marking by comparing the image intensity of the middle region relative to image intensities of the left region or the right region, the method further comprises:
   performing linear regression processing on the left region and the right region to obtain respective linear regression lines;
   calculating an average linear regression line of the left region and the right region according to the respective corresponding linear regression lines of the left region and the right region; and
   compensating the image intensity distribution along the vertical direction of the original image in the left region, the right region and the middle region according to the average linear regression line.

5. A monocular camera, comprising:
   one or more processors; and
   a memory, configured for storing one or more programs;
   wherein, when the one or more programs is executed by the one or more processors, a method for identifying road markings as claimed in claim 1 is completed by the one or more processors, and the one or more processors comprises:
   an image acquiring module, configured for acquiring an original image captured by a monocular camera on a vehicle;
   a region determining module, configured for determining a middle region where an object is located and a left region and a right region on both sides of the middle region from the original image;
   an intensity acquiring module, configured for acquiring an image intensity distribution along a vertical direction of the original image in the left region, the right region and the middle region; and
   a first identifying module, configured for determining whether the object is a road marking by comparing an image intensity of the middle region relative to image intensities of the left region or the right region;
   wherein the region determining module comprises:

an image processing sub-module, configured for processing image preprocessing on the original image to obtain a corresponding differential image, acquiring a binary image or a ternary image by applying a threshold to the corresponding differential image, acquiring edge points in the binary image or the ternary image, and grouping the edge points according to edge point continuity to obtain several edge point groups; and a region determining sub-module, configured for arranging the middle region to include the edge point groups in the binary image or the ternary image; and arranging the left region and the right region at left and right sides of the middle region, respectively; and wherein the first identifying module comprises:

a first calculating sub-module, configured for calculating a first intensity average value, wherein the first intensity average value is an image intensity average value in the left region or the right region;

a second calculating sub-module, configured for calculating a second intensity average value, wherein the second intensity average value is an image intensity average value of peak values or valley values of the image intensity distribution in the middle region; and a first determining sub-module, configured for determining, if a difference between the first intensity average value and the second intensity average value is less than a preset average value threshold, the object to be the road marking; wherein the preset average value threshold is configured to be less than a difference between the image intensity average value of the peak values and the image intensity average value of the valley values.

6. The monocular camera according to claim 5, wherein the one or more processors further comprises:

a second identifying module, configured for:

processing image preprocessing on the original image to obtain a corresponding differential image;

acquiring a binary image or a ternary image by applying a threshold to the corresponding differential image;

acquiring edge points in the binary image or the ternary image;

grouping the edge points according to an edge point continuity, and estimating an edge line of the object according to each acquired edge point group; and determining the object to be the road marking when a number of groups included in the edge line is greater than a preset group threshold and a number of edge points in each of the groups is less than a preset point threshold.

7. The monocular camera according to claim 5, wherein the first identifying module further comprises:

a third calculating sub-module, configured for calculating a first intensity standard deviation, wherein the first intensity standard deviation is an image intensity standard deviation in the left region or the right region;

a fourth calculating sub-module, configured for calculating a second intensity standard deviation, wherein the second intensity standard deviation is the image intensity standard deviation of the peak values or valley values of the image intensity distribution in the middle region; and a second determining sub-module, configured for determining, if a difference between the first intensity standard deviation and the second intensity standard deviation is less than a preset standard deviation threshold and a difference between an average image intensity of the peak values and the valley values is greater than the first intensity standard, the object to be the road marking.

8. The monocular camera according to claim 5, wherein the one or more processors further comprises:

an intensity compensation module, configured for:

performing linear regression processing on the left region and the right region to obtain respective linear regression lines;

calculating an average linear regression line of the left region and the right region according to the respective corresponding linear regression lines of the left region and the right region; and compensating the image intensity distribution along the vertical direction of the original image in the left region, the right region and the middle region according to the average linear regression line.

9. A non-statutory machine-readable storage medium having stored thereon instructions, and the instructions are configured for executing a method for identifying road markings by the machine, the method comprises:

acquiring an original image captured by a monocular camera on a vehicle;

determining a middle region where an object is located and left and right regions on both sides of the middle region from the original image;

acquiring an image intensity distribution along a vertical direction of the original image in the left region, the right region and the middle region; and calculating a first intensity average value, wherein the first intensity average value is an image intensity average value in the left region or the right region;

calculating a second intensity average value, wherein the second intensity average value is an image intensity average value of peak values or valley values of the image intensity distribution in the middle region; and determining, if a difference between the first intensity average value and the second intensity average value is less than a preset average value threshold, the object to be the road marking;

wherein the preset average value threshold is configured to be less than a difference between the image intensity average value of the peak values and the image intensity average value of the valley values;

wherein the step of determining the middle region where the object is located and the left region and the right region on both sides of the middle region from the original image comprises:

processing image preprocessing on the original image to obtain a corresponding differential image;

acquiring a binary image or a ternary image by applying a threshold to the corresponding differential image;

acquiring edge points in the binary image or the ternary image;

grouping the edge points according to an edge point continuity to obtain several edge point groups;

arranging the middle region to include the edge point groups in the binary image or the ternary image; and arranging the left region and the right region at left and right sides of the middle region, respectively.

* * * * *